United States Patent

Helgren et al.

[11] Patent Number: 5,403,525
[45] Date of Patent: Apr. 4, 1995

[54] METHOD OF FORMING A RESEAL MEMBER FOR USE WITH BLUNT CANNULAS

[75] Inventors: R. Hayes Helgren, Mundelein; Thomas E. Mattice, Zion, both of Ill.

[73] Assignee: Abbott Laboratories, Abbott Park, Ill.

[21] Appl. No.: 134,773

[22] Filed: Oct. 12, 1993

[51] Int. Cl.⁶ .......................................... B29C 71/04
[52] U.S. Cl. ........................................ 264/23; 264/69; 428/43
[58] Field of Search ............... 264/23, 69; 156/73.1, 156/73.2, 73.3, 73.6; 428/43

[56] References Cited

U.S. PATENT DOCUMENTS

| | | | |
|---|---|---|---|
| 3,972,758 | 8/1976 | Bieber | 264/69 |
| 4,068,032 | 1/1978 | Alonso | 264/23 |
| 4,265,842 | 5/1981 | Summo | 264/23 |
| 4,343,845 | 8/1982 | Burden et al. | 264/177.1 |
| 5,258,413 | 11/1993 | Isayer . | |

FOREIGN PATENT DOCUMENTS

| | | | |
|---|---|---|---|
| 2715747 | 10/1977 | Germany | 264/23 |
| 61-225317 | 10/1986 | Japan | 264/23 |

Primary Examiner—Mathieu D. Vargot
Attorney, Agent, or Firm—A. Nicholas Trausch

[57] ABSTRACT

A reseal member having a preferentially weakened central portion, and a method of its manufacture through the application of ultrasonic energy. The reseal is for use with an associated blunt cannula. The reseal comprises a central region and a peripheral region. The central region has a predetermined thickness and includes, in the direction of thickness, a weakened portion extending at least partially therethrough. The upper and lower surface portions of the reseal are continuous and unbroken. A method of forming the weakened central portion includes the steps of positioning the reseal member in an ultrasonic energy generating device, placing the member in compression, and imparting a predetermined amount of ultrasonic energy, in the form of vibrational energy, into the reseal member. The present reseal member can be used for solution vials and containers, tubing set Y-sites, and similar applications.

4 Claims, 1 Drawing Sheet

METHOD OF FORMING A RESEAL MEMBER FOR USE WITH BLUNT CANNULAS

FIELD OF THE INVENTION

The present invention relates to reseal members for containers and more particularly to a reseal member having a preferentially weakened central portion formed ultrasonically, for use with a blunt cannula to be inserted therethrough.

BACKGROUND OF THE INVENTION

Reseal members are in wide-spread use in the health care industry on solution containers which may require the insertion of a needle or cannula to add or withdraw solution from the container.

Typically, reseals are used on containers or vials for medicament, parenteral solutions and the like, as well as at Y-sites of tubing sets for infusion. The reseals provide easy access to the solution by use of a hypodermic needle or cannula inserted therethrough. Reseals are typically fabricated of natural rubber. This material has the inherent ability to retain geometric memory or shape once punctured. As such, it provides an excellent seal for a container subsequent to initial puncture.

In order to promote safety in the performance of health care procedures, the use of blunt, relatively unsharpened cannulas is becoming increasingly prevalent. However, one of the design criteria which must be accommodated is connection with the use of blunt cannulas relates to the piercing force required to insert the cannula through a reseal. Inherent with the resilient properties of the reseal material is a relatively high tensile strength.

Accordingly, a reseal member is disclosed in which both upper and lower surfaces are continuous and unbroken, thus desirably inhibiting contamination, with the region therebetween preferentially weakened to facilitate insertion of a needle or blunt cannula therethrough.

SUMMARY OF THE INVENTION

In accordance with the present invention a reseal member is disclosed which is for use with a blunt cannula to be inserted therethrough, and which includes a reseal element having a peripheral region and a central region, and which is formed to a predetermined thickness. The central region includes, in the direction of thickness, a preferentially weakened portion extending at least partially through the reseal member, with the upper and lower surface portions of the member being continuous and unbroken. In preferred embodiments, the reseal member is approximately 0.125 inches thick, the weakened portion is substantially centrally located in the direction of thickness between the upper and lower surfaces, the weakened portion is formed by the use of ultrasonic energy and the reseal member is formed from a natural rubber such as gum rubber or the like.

In a preferred method of manufacture, a natural rubber reseal member is placed on an anvil and the horn or transmitting component of an ultrasonic energy generating device is placed on the reseal member proximately above the anvil. The reseal member is then compressed therebetween to a thickness on the order of approximately 0.007 inches, and a pulse of ultrasonic energy is transmitted therethrough. The ultrasonic energy is input at about 50 to about 100 joules for a period for about 2.0 to about 2.5 seconds. The amplitude of the energy wave is about 0.003 to about 0.005 inches and has a frequency of about 40 kilohertz.

The result is a reseal element wherein the upper and lower surface portions are continuous and unbroken and the portion therebetween is sufficiently weakened to allow insertion of a blunt cannula therethrough without requiring excessive force.

Other features and advantages of the present invention will be apparent from the following detailed description, the accompanying drawings and the appended claims.

DETAILED DESCRIPTION OF THE PREFERRED EMBODIMENTS

Figure 1:
FIG. 1 is a perspective view of an exemplary solution vial, with a ferrule securing a reseal member with an ultrasonically weakened central portion embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Figure 2:
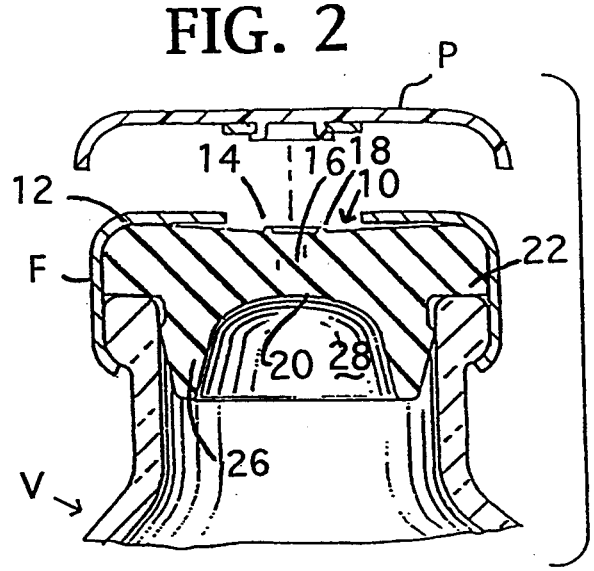
FIG. 2 is a cross-sectional view of the exemplary solution vial, ferrule and reseal of FIG. 1 further showing a protective cover removed therefrom.

With reference now to the drawings, therein are illustrated an exemplary vial V for solution storage, ferrule F and reseal member 10 with an ultrasonically weakened central portion 16. The reseal member 10 has a peripheral region 12 and a central region 14. Central region 14 is formed with the weakened central portion 16 and has continuous and unbroken upper and lower surface portions 18, 20. Extending from peripheral region 12, the outer edge of member 10 terminates in an annular lip 22. FIG. 2 illustrates a typical protective cover which is removably secured to ferrule F prior to introduction of an associated cannula.

Figure 3:
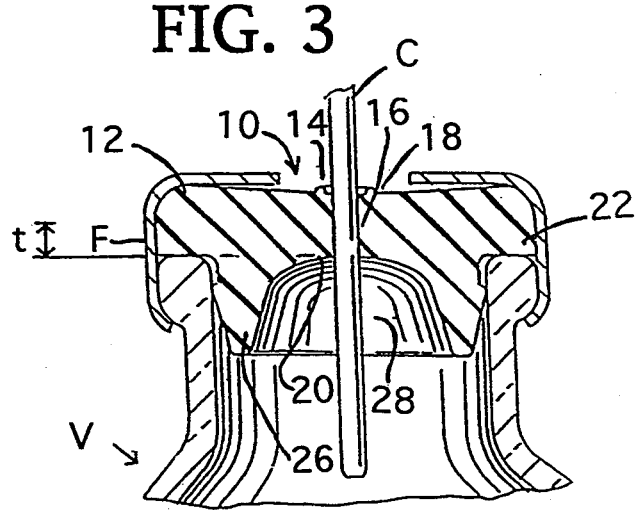
FIG. 3 is a partial cross-sectional view of the arrangement of FIG. 2 further showing a blunt cannula inserted through the reseal.

Seal member 10 has an annular frusto-conical plug portion 26 depending therefrom which defines a hollow region 28 therein. As best seen in FIG. 3, reseal member 10 has a predetermined thickness t which is defined as the distance between the uppermost portion of hollow region 28 and upper surface portion 18. In a presently preferred construction, thickness t is about 0.125 inches. Reseal member 10 is fabricated from a resilient material. In a preferred form of manufacture, member 10 is made of a natural rubber material such as gum rubber or the like, which material is typified as comprising long chain hydrocarbon molecules.

Figure 4:
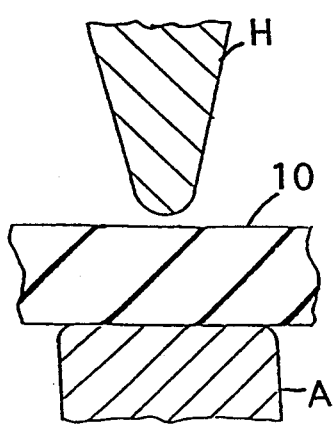
FIG. 4 is an illustration of the first step of a method of forming the reseal with an ultrasonically weakened central portion showing the reseal positioned in an associated ultrasonic energy generator.
Figure 5:
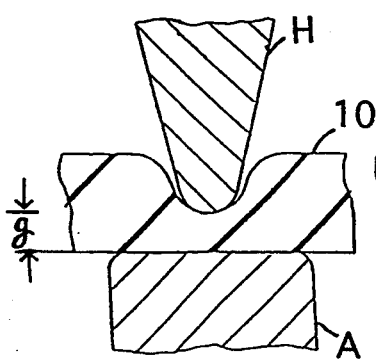
FIG. 5 is an illustration of the second step of the method of forming the reseal showing the reseal member under compression.
Figure 6:
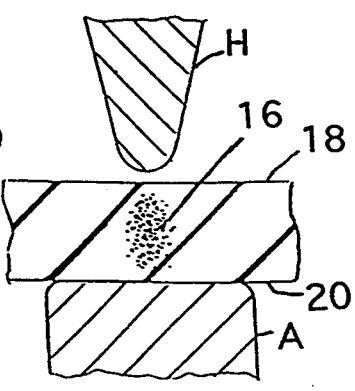
FIG. 6 is an illustration of the reseal of FIG. 5 subsequent to energy transmission and illustrating the weakened portion.

Weakened central portion 16 is preferably formed through a process whereby the reseal member 10 is subjected to ultrasonic energy, as will be best understood by reference to FIGS. 4 through 6. Reseal member 10 is positioned in an ultrasonic energy generator and placed on a rigid, heat conductive surface such as the exemplary anvil A. As shown in FIG. 5 the horn H which is the transmitting component of the ultrasonic generator is brought into contact with the reseal member 10 and further places member 10 in compression. The gap setting g, which is the distance between horn H and anvil A at the point of compression is about 0.007 inches. The horn H and anvil A are preferably fabricated from a highly heat conductive material such as copper, aluminum, or the like.

While in compression, a pulse of ultrasonic energy is transmitted from horn H into reseal member 10. Parametrically, the ultrasonic energy input is about 50 to about 100 joules and it is transmitted for a period of about 2.0 to about 2.5 seconds. The horn H frequency is adjusted to about 40 kilohertz and the amplitude of the transmission is about 0.003 to about 0.005 inches.

Surprisingly, it has been found that the region of the member more central in the elastomeric material from the horn and anvil is degraded more than the regions immediately adjacent the areas of contact of the member with the horn and anvil.

The ultrasonic energy transmission is imparted to member 10 in the form of vibrational energy with varying degradation effect depending on the proximity of a given region of the elastomeric material to the horn and the anvil. The ultrasonic, vibrational energy is believed to be converted, by friction, to heat energy internal to member 10. The term "degradable", as used herein, is intended to imply that the process results in weakened or destroyed bonds, on a macro scale, resulting in the weakened central portion.

Because of the materials and configuration of the horn H and anvil A, the upper and lower surface portions 18, 20 remain relatively unaffected, e.g. continuous and unbroken, by the ultrasonic energy imparted to member 10. The vibrational energy input to member 10 is converted into heat energy due to the frictional forces. It is this heat energy which weakens the molecular bonds. However, as previously noted, the anvil A and horn H are fabricated from materials which are highly heat conductive. The horn H and anvil A, respectively in contact with the upper and lower surface portions 18, 20 tend to conduct heat away from these surfaces. As a result, it is believed that heat does not build up in these surfaces, possibly contributing to the result that the bonds forming the material of the surface portions 18, 20 are relatively unaffected. In any event, these surfaces remain continuous and unbroken. In addition, it is believed that the horn H "couples" (i.e., moves) with that portion of the upper surface portion 18 with which it is in contact possibly resulting in vibrational energy which would otherwise be converted to heat at the contacting surface being directed into the central portion 16, instead of into the surface portion 18.

The resultant upper and lower surface portions 18, 20 are sufficiently thin such that minimal force is required to pierce therethrough, even with a blunt object such as the exemplary blunt cannula C. The smooth, continuous and unbroken surface portions 18, 20 provide an ideal configuration for sterilization and assurance that biological contaminations do not exist in any surface irregularities.

An additional distinct advantage over the prior art methods of pre-piercing such reseals is that the prior art methods typically required that the lance or piercing tool be lubricated to provide a smooth cut and to a predetermined depth. The present method, which does not employ piercing, precludes the potential for lubricant to be entrapped between the surfaces of the cut.

The thickness of the reseal member will depend upon the requirements of the particular use. The thickness of the weakened central portion is controlled through process control of the ultrasonic energy parameters such as horn frequency and amplitude, energy input, and physical parameters such as the initial thickness of the member, and the gap setting between the horn and anvil during compression and operation.

The present reseal can be used, as shown, with an exemplary solution vial. In addition, such reseals can be incorporated into intravenous containers, on tubing set Y-sites, and other typical applications.

In use, the reseal is positioned, as shown with the exemplary solution vial V, at the opening of a container, and is secured in place using an appropriate means. A blunt cannula is placed against the upper surface portion 18, and forced through upper surface portion 18, central portion 16, and lower surface portion 20. The pressure exerted on cannula C during insertion serves to form an opening through the member, including surface portions 18, 20. After solution is added to, or taken from the vial V, the cannula C can then be withdrawn from the vial, and the reseal member, including surface portions 18, 20, will return to its initial shape. Although an opening will exist through member 10, because of the inherent resilience of the material, the member will reseal to limit fluid communication between the contents of vial V and the environs.

From the foregoing it will be observed that numerous modifications and variations can be effectuated without departing from the true spirit and scope of the novel concept of the present invention. It is to be understood that no limitation with respect to the specific embodiment illustrated is to be intended or should be inferred. The disclosure is intended to cover by the appended claims all such modifications as fall within the scope of the claims.

What is claimed is:

1. A method of forming a weakened portion within a reseal member by use of an associated ultrasonic energy generator comprising the steps of:
    providing a natural rubber reseal member, said reseal member having a central region and a peripheral region, said central region having a predetermined thickness for insertion of a blunt cannula therethrough;
    positioning said central region portion between an anvil and a horn of said ultrasonic energy generator; and
    applying an effective amount of ultrasonic energy to said central region to form a weakened portion extending at least partially through the thickness of said reseal member, with upper and lower surface portions of said reseal member being generally unaffected and continuous and unbroken.

2. The method of claim 1 wherein said positioning step includes compressing said central region between said anvil and said horn of said ultrasonic energy generator to a thickness of about 0.007 inches.

3. The method of claim 1 wherein said applying step includes ultrasonic energy input of about 50 to about 100 joules for a period of about 2 to about 2.5 seconds.

4. The method of claim 1 wherein said applying step includes ultrasonic energy at an amplitude of about 0.003 to about 0.005 inches and a frequency of about 40 kilohertz.

* * * * *